United States Patent [19]

Matsui

[11] 4,391,250
[45] Jul. 5, 1983

[54] SYSTEM FOR DETECTING THE OPERATION OF THE THROTTLE VALVE

[75] Inventor: Fujio Matsui, Mitaka, Japan

[73] Assignees: Fuji Jukogyo Kabushiki Kaisha, Tokyo; Nissan Motor Co., Ltd., Yokohama, both of Japan

[21] Appl. No.: 174,373

[22] Filed: Aug. 1, 1980

[30] Foreign Application Priority Data

Aug. 2, 1979 [JP] Japan .................................. 54-98918

[51] Int. Cl.³ .......................................... F02D 35/00
[52] U.S. Cl. .................................... 123/438; 123/492; 123/493; 123/494; 123/440; 324/176
[58] Field of Search ............... 123/492, 493, 494, 422, 123/423, 440, 489, 438; 324/176

[56] References Cited

U.S. PATENT DOCUMENTS

| | | | |
|---|---|---|---|
| 3,335,708 | 8/1967 | Beddoes et al. | 123/492 |
| 4,046,118 | 9/1977 | Aono | 123/440 |
| 4,144,847 | 3/1979 | Hosaka | 123/492 |
| 4,227,507 | 10/1980 | Takase et al. | 123/492 |

*Primary Examiner*—Charles J. Myhre
*Assistant Examiner*—Andrew M. Dolinar
*Attorney, Agent, or Firm*—Martin A. Farber

[57] ABSTRACT

A system for detecting the operation of the throttle valve of an internal combustion engine for an emission control system for internal combustion engines. The emission control system has a three-way catalyst convertor, a detector, such as an oxygen sensor for detecting the concentration of oxygen in the exhaust gases, an on-off type electromagnetic valve for correcting the air-fuel ratio of the air-fuel mixture and an electronic controller. The system comprises a transducer, such as a potentiometer and a pair of sample-and-hold circuits, in which each gate thereof is periodically operated by pulse trains for sampling and holding the output voltage of the transducer, which pulse trains have a 180 degrees phase difference with respect to each other. Both sample-and-hold circuits are connected to an operational amplifier type comparator through relay switches. The relay switches are operated in synchronism with the pulses of the pulse trains for applying the increment of the output voltage of each sample-and-hold circuit into the non-inverting input of the comparator, whereby the angular velocity and operating duration of the throttle valve is represented by a voltage.

11 Claims, 9 Drawing Figures

SYSTEM FOR DETECTING THE OPERATION OF THE THROTTLE VALVE

BACKGROUND OF THE INVENTION

The present invention relates to a system for detecting operating parameters of the throttle valve, such as angular velocity which is used in an emission control system for internal combustion engines.

The emission control system with a three-way catalyst converter as in U.S. Pat. No. 4,132,199 is provided with an oxygen sensor to sense the oxygen content of exhaust gases to generate an electrical signal as an indication of the air-fuel ratio of the air-fuel mixture supplied to the engine. The control system operates to detect whether the feedback signal from the oxygen sensor is higher or lower than the stoichiometric value, for producing an error signal and to control the air-fuel ratio of the mixture to be induced into the engine in accordance with the error signal. Such a feedback control system inherently oscillates due to the detection delay of the oxygen sensor, the control delay in the system. The oscillation of the system causes the variation of the controlled air-fuel ratio relative to the stoichiometric value. Such a variation is increased during an acceleration condition of the engine and the control operation is greatly delayed during such a condition.

Consequently, the emission control cannot accomplish the desired reduction of the harmful constituents of the exhaust gases. In order to compensate for this, it is necessary to detect operating parameters such as the angular velocity, angular acceleration, duration or opening angle of the throttle valve.

SUMMARY OF THE INVENTION

The object of the present invention is to provide a system which may quantitatively detect the operation of the throttle valve.

According to the present invention, a system is provided for detecting the operation of the throttle valve in an internal combustion engine, comprising a transducer for converting a physical parameter of the operation of the throttle valve into an electrical signal, a holding circuit for holding an increment of the output voltage of said transducer with respect to time, and an output circuit for continuously producing an output voltage corresponding to said increment until the increment changes to zero or a negative value.

Other objects and features of the present invention will become apparent from the folllowing description of a preferred embodiment with reference to the accompanying drawings.

BRIEF DESCRIPTION OF THE DRAWINGS

FIGS. 3A–3I show waveforms at portions in the circuit of FIG. 2.

DETAILED DESCRIPTION OF THE PREFERRED EMBODIMENT

Figure 1:
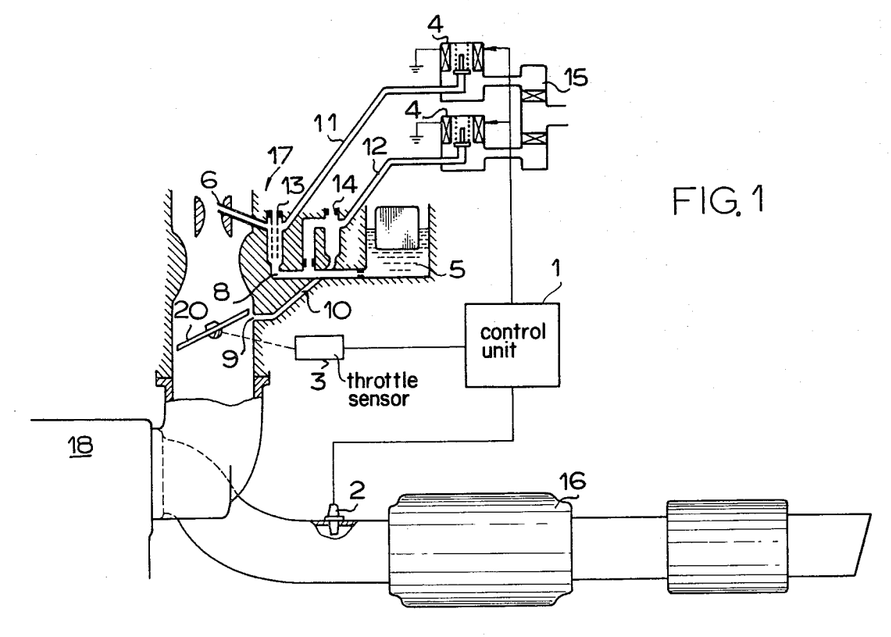
FIG. 1 is a schematic view of an example of an electronic system for controlling air-fuel ratio in a carburetor shown partially in section.

Referring to FIG. 1, a control unit 1 supplies output signals of an oxygen sensor 2 and a throttle sensor 3 are to control the air-fuel ratio as described hereinafter. A carburetor 17 communicates with an internal combustion engine 18. The carburetor comprises a float chamber 5, a nozzle 6 in a venturi communicating with the float chamber 5 through a main fuel passage 8, and a slow port 9 communicating with the float chamber 5 through a slow fuel passage 10. Air correcting passages 11 and 12 are provided in parallel to a main air bleed 13 and a slow air bleed 14, respectively. On-off type electromagnetic valves 4 are provided to open and close the air correcting passages 11 and 12. The inlet port of each on-off type electromagnetic valve 4 communicates with the atmosphere through an air cleaner 15. The oxygen sensor 2 which detects the oxygen content of the exhaust gases is disposed in the exhaust pipe upstream of a three-way catalytic converter 16.

Figure 2:
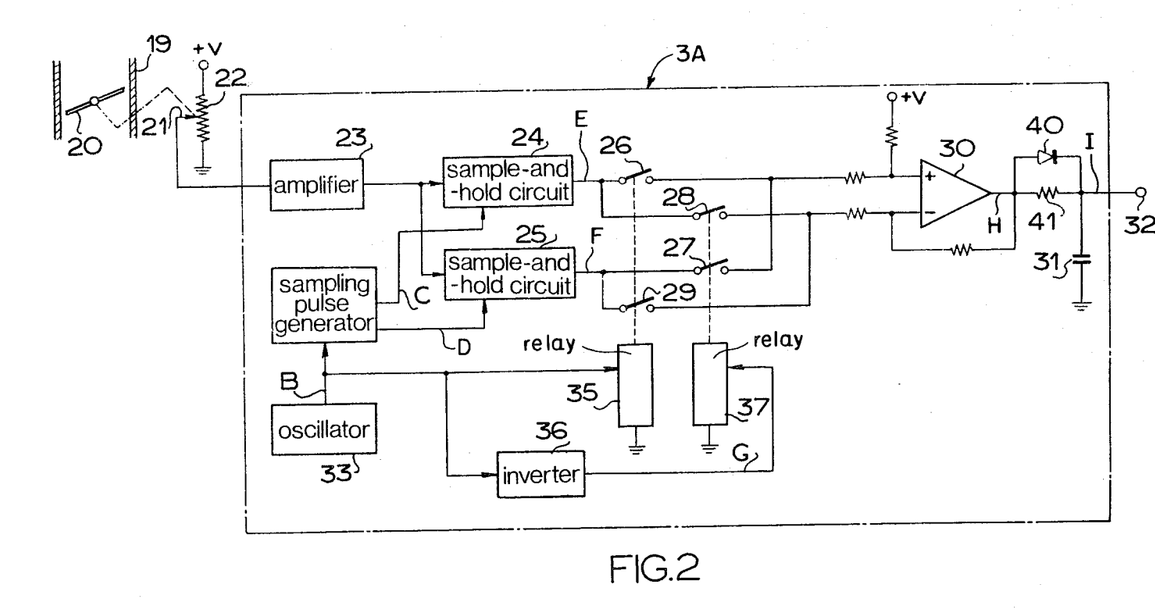
FIG. 2 is a block diagram of an electronic control system according to the present invention.
Figure 2A:
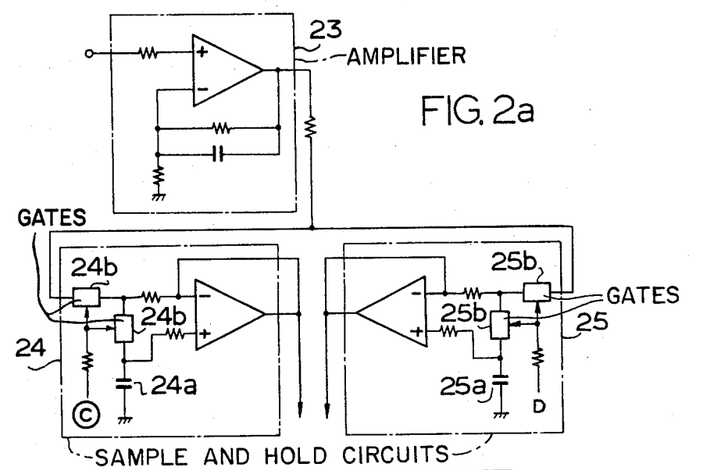
FIG. 2a shows sample-and-hold circuits.

Referring to FIG. 2 an electronic control system 3A for the throttle sensor is illustrated. A throttle valve 20 is provided in a venturi 19 in the intake passage of the carburetor. The throttle valve is connected to a sliding contact or wiper 21 of a potentiometer 22 which is applied with a voltage V. The voltage from the wiper 21 is applied to sample-and-hold circuits 24 and 25 via an amplifier 23. As shown in FIG. 2a, sample-and-hold circuits 24 and 25 comprise holding capacitors 24a, 25a and gates 24b, 25b, respectively. The sample-and-hold circuit 24 is connected to the input terminals of an operational amplifier comparator 30, comprising an operational amplifier, through relay contacts (switches) 26 and 28 respectively. The sample-and-hold circuit 25 is also connected to the input terminals of the operational amplifier 30 through relay contacts (switches) 27 and 29.

Figure 2B:
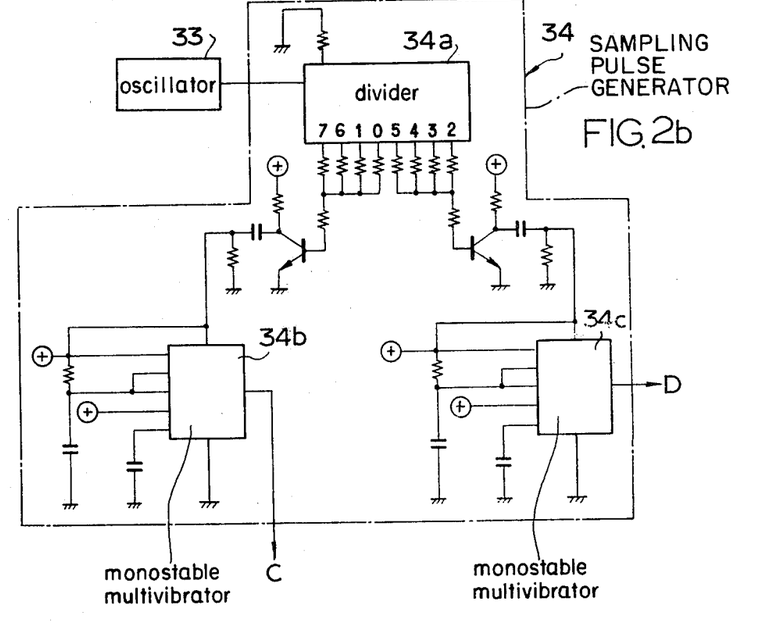
FIG. 2b shows a sampling pulse generator.

On the other hand, an oscillator 33 is connected to a sampling pulse generator 34 for producing a sampling pulse train. The sampling pulse generator 34, as shown in FIG. 2b, comprises a divider 34a with a decoder and monostable multivibrators 34b and 34c, and produces sampling pulses (C) of FIG. 3 and sampling pulses (D) which have a 180 degree phase difference relative to the pulses (C). The sampling pulses (D) and (C) are produced at the trailing and leading edges, respectively, of the pulses (B) from the oscillator 33. The sampling pulses (C) are fed to the sample-and-hold circuit 24 to actuate its gate 24b and the pulses (D) are fed to the gate 25b of the sample-and-hold circuit 25. The output of the oscillator 33 is also sent to a relay 35 and further to a relay 37 through an inverter 36. The relay 35 is adapted to actuate the relay contact 26 which connects the sample-and-hold circuit 24 to the non-inverting input of the comparator 30 and the relay contact 29 which connects the sample-and-hold circuit 25 to the inverting input of the comparator 30. The relay contacts 28 and 27 are connected with respect to the inputs of the comparator 30 in reverse relationship to the relay contacts 26 and 29. The relays 35 and 37 operate the switches 26, 29 and 28, 27 respectively.

Figure 3:
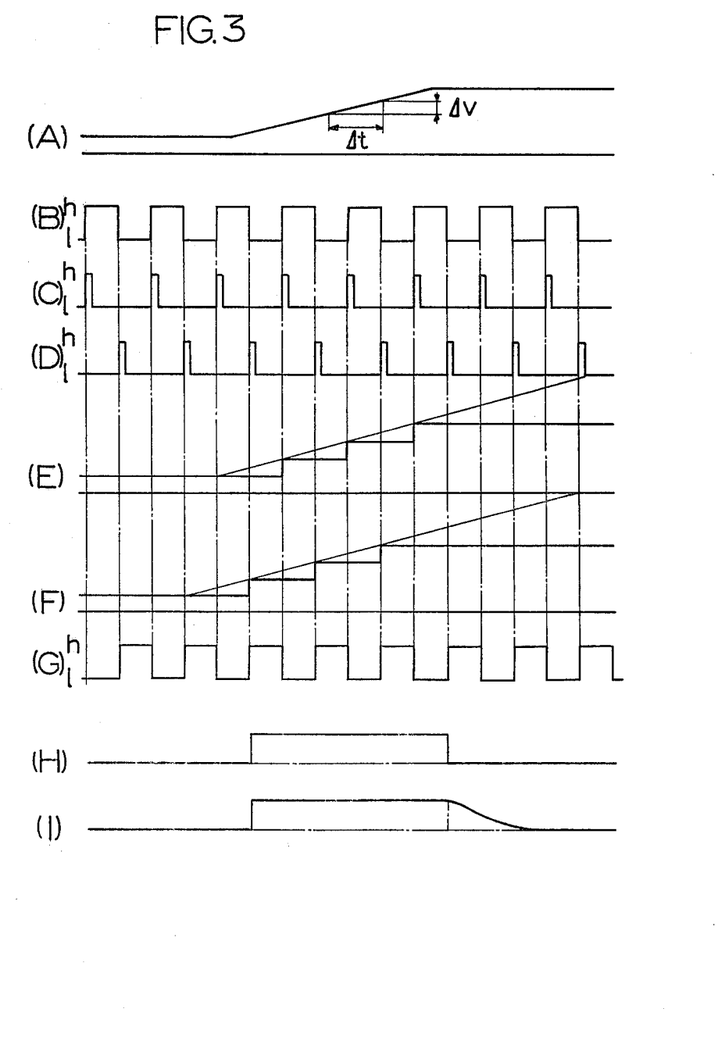

Referring to FIG. 3, curve(A) shows the voltage(A) detected by the potentiometer 22, which increases with an increase of the opening angle of the throttle valve 20. The sample-and-hold circuit 24 receives the voltage signal FIG. 3(A) from the potentiometer 22 via amplifier 23 and the sampling pulses (C) from the pulse generator 34 to produce the output voltage (E), and the sample-and-hold circuit 25 is actuated by the voltage signal (A) from the potentiometer 22 via amplifier 23 and the sampling pulses (D) from the pulse generator 34 to produce the output voltage (F). More particularly, as well known per se, when the gate 24b, 25b of each sample-and-hold circuit is opened by the high level pulse "h" from the sampling pulse generator 34, the voltage from the potentiometer 22 via the amplifier 23 is charged in the capacitor 24a, 25a in the respective sample-and-hold circuit 24, 25.

FIG. 3(G) shows the inverted wave form at the output of the inverter 36. The relay 35 is operated by the higher voltage "h" of the output pulses FIG. 3 (B) of the oscillator 33 to close the relay contacts 26 and 29, and the relay 37 is operated by the higher voltage "h" of the output pulses (G) to close the relay contacts 28 and 27. Thus, the comparator 30 compares the voltages (E) and (F) alternately so that output voltage FIG. 3 (H) is produced at the output of the comparator. The magnitude (that is the height) of the output voltage signal FIG. 3 (H) is the voltage increment $\Delta V$ (i.e. the change) of the output voltage (A) with respect to time $\Delta t$ between successive pulses (C) and (D). Thus, the angular velocity of the throttle valve 20 may be represented by the output voltage Fig. 3 (H). When the throttle valve stops or rotates in reverse, the output voltage of the comparator 30 disappears. Thus, the angular velocity and duration of the operation of the throttle valve may be quantitatively represented by the output voltage at an output terminal 32.

A grounded capacitor 31 is connected to a diode 40 which together with a resistor 41 are connected between the comparator 30 and the output terminal 32. The peak voltage is charged in the capacitor 31. When the throttle valve acceleration operation stops, the charged voltage on the capacitor 31 discharges through the resistor 41. The voltage reduces as shown in FIG. 3 (I). If the output voltage from the output terminal 32 is differentiated by a differentiator (not shown), the angular acceleration of the throttle valve 20 can be represented.

Figure 4:
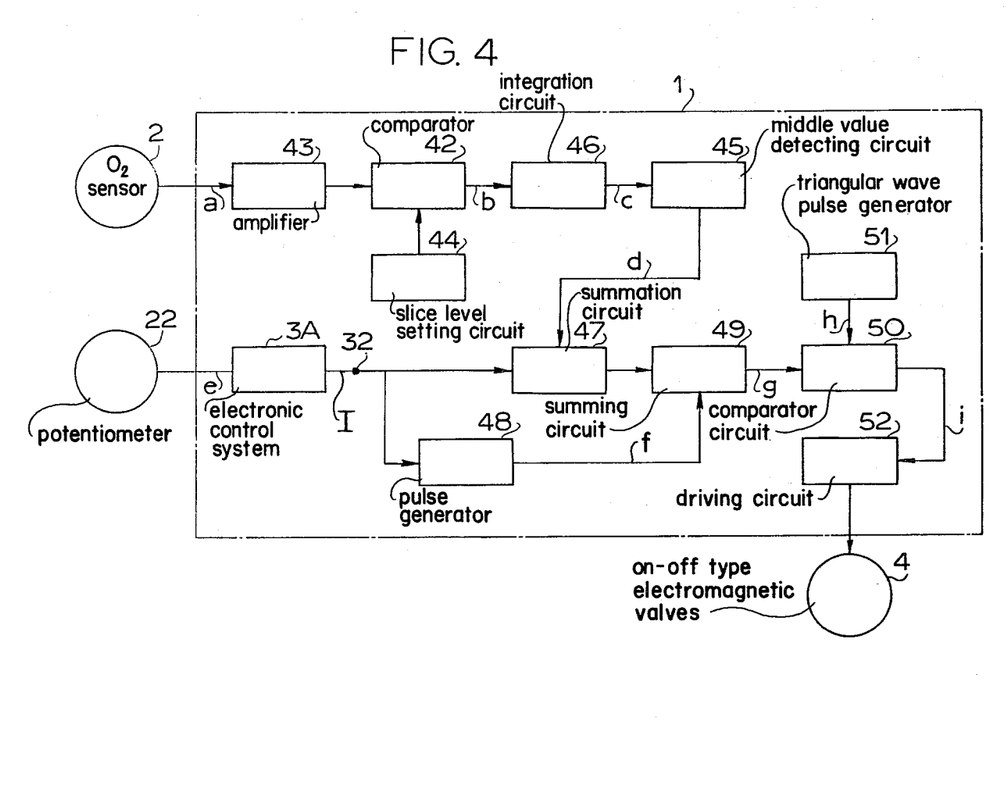
FIG. 4 is a block diagram of an electronic control circuit in which the system of the present invention can be used.
Figure 6:
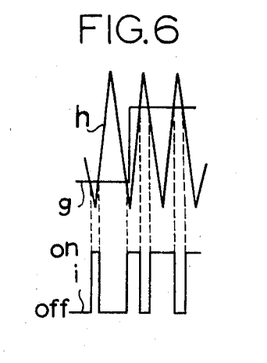
FIG. 6 shows wave forms for explaining the operation of a comparator in FIG. 2.
Figure 7:
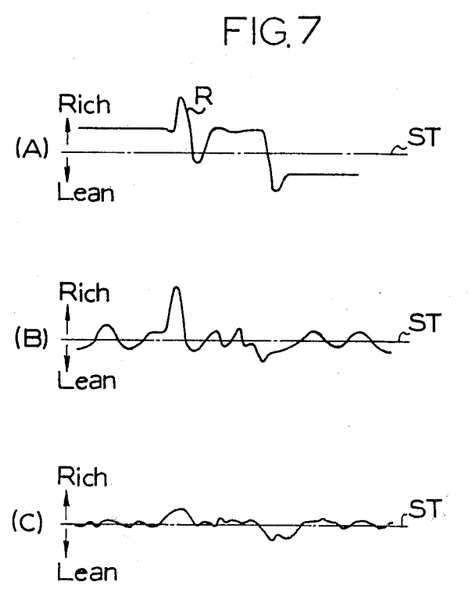
FIG. 7 shows wave forms of air-fuel ratio.

A system using the system of the present invention for controlling the air-fuel ratio is now described by reference to FIG. 4 showing an example of the air-fuel ratio control system. The wave forms shown in FIG. 3 and FIGS. 6 and 7 are denoted in the circuit of FIG. 4 where they occur for case of reference.

The output signal of the oxygen sensor 2 is sent to a comparator 42 via an amplifier 43. The comparator 42 operates to compare the input signal thereto with reference to a slice level applied from a slice level setting circuit 44 to produce an output higher or lower than the slice level. The output is applied to a middle value detecting circuit 45 through an integration circuit 46. The output terminal of the circuit 45 is connected to a summation circuit 47.

On the other hand, the output terminal 32 of the electronic control system 3A is connected to the summation circuit 47. Thus, the output of the circuit 45 and the output of the control system 3A are summed by the summation circuit 47. The output voltage of the control system 3A is also applied to a pulse generator 48. The pulse generator 48 is adapted to generate a pulse train having a pulse-repetition frequency which is dependent upon the angular velocity of the throttle valve 20 and upon the duration of the acceleration. The outputs of the circuits 47 and 48 are sent to a summing circuit 49. The output signal of the circuit 49 is compared in a comparing circuit 50 with triangular wave pulses applied from a triangular wave pulse generator 51. The output of the circuit 50 is fed to the on-off type electromagnetic valves 4 through a driving circuit 52.

Figure 5:
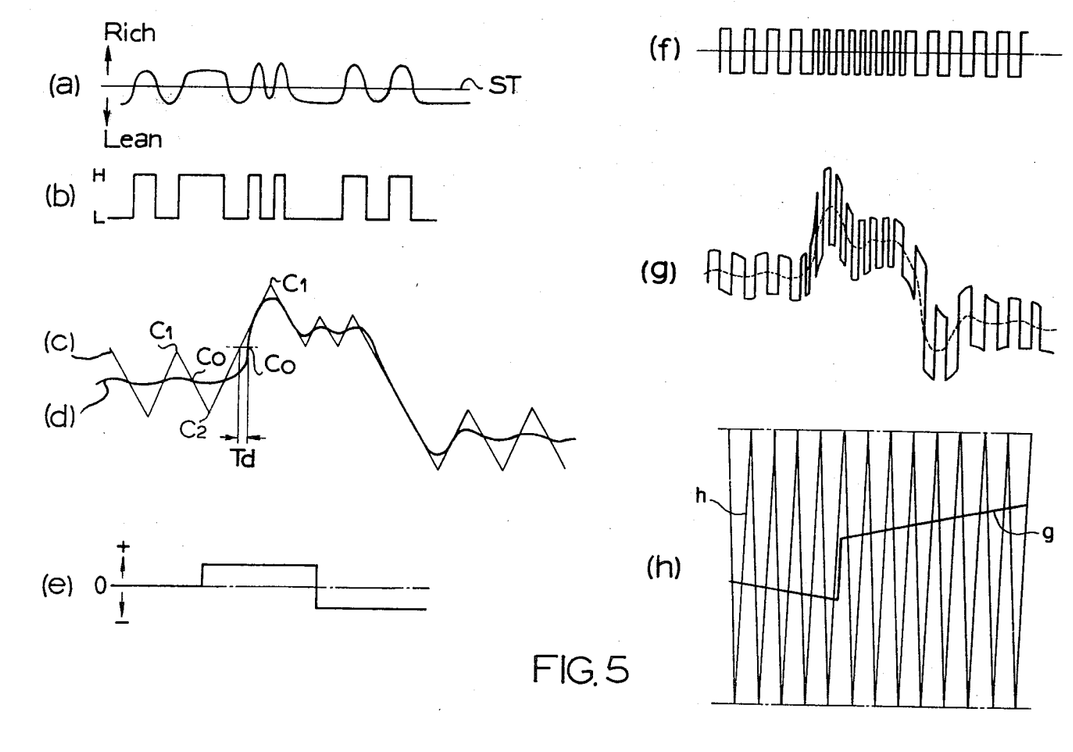
FIG. 5 shows wave forms at some portions in the circuit of FIG. 4.

The operation of the system is now explained with reference to FIGS. 4 to 7, FIG. 7A which shows an example of the variation of the air-fuel ratio of air-fuel mixture in an internal combustion engine. The upper side of the stoichiometric air-fuel ratio line (St) is for rich air-fuel mixture. A rise "R" of the air-fuel ratio occurs often upon acceleration of the engine because of the enrichment operation of the power device in the engine for the acceleration. The oxygen sensor 2 produces an output voltage which changes in dependency on the air-fuel ratio of FIG. 7A as shown in FIG. 5(a). When the air-fuel mixture is rich, the output voltage has a higher level than the voltage corresponding to the stoichiometric value, and when the mixture is lean, the output voltage has a lower level. The output signal of the oxygen sensor 2 is fed to the comparator 42 through the amplifier 43. The comparator 42 judges the input signal thereto through from the amplifier by comparing it with a slice level applied from a slice level setting circuit 44 to produce a square wave pulse wave output as shown in FIG. 5(b). The slice level is set to a value corresponding to the stoichiometric air-fuel ratio as noted in FIG. 5(a). The pulse wave output is integrated in the integration circuit 46 as shown in FIG. 5(c). The middle value detecting circuit 45 detects a middle value $C_0$ between maximum and minimum voltages $C_1$ and $C_2$, respectively, of each linear section of the integrated triangular wave. FIG. 5(d) shows the variation of the middle value signal.

In a conventional system, the output of the integration circuit 46 is fed directly to a comparator circuit 50, where it is compared with triangular wave pulses from a triangular wave pulse generator 51 for producing driving pulses. FIG. 7(B) shows a variation of the controlled air-fuel ratio in the conventional system corresponding to FIG. 7(A). From this figure, it will be seen that the air-fuel ratio of FIG. 7(A) is controlled in a range close to the stoichiometric value line (St) but has rich-lean variations, even though rich-lean variations do not exist in the wave form of the air-fuel ratio in FIG. 7(A). This is caused by the fact that the control of the electromagnetic valves is carried out with the integrated wave from circuit 46 and that the variation of the integrated wave causes the controlled air-fuel ratio to vary.

The system in FIG. 4 resolves such a problem by using the middle value $C_0$ between maximum and minimum values of the integrated wave as a reference signal. More particularly, in FIG. 4 (although not shown), the output of the middle value detecting circuit 45 can be fed directly to the comparing circuit 50 for controlling the electromagnetic valves 4. By such a system, it is possible for the air-fuel ratio to approach the stoichiometric value. However, it will also be seen that since the middle value $C_0$ is determined when the output voltage of the integration circuit 46 reaches a maximum value $C_1$, the middle value signal $C_0$ is generated after the output of the circuit actually reaches the middle value $C_0$. This occurs notably in acceleration operation. Such a delay is shown by "Td" in FIG. 5(c). The delay will cause the control delay. In addition, the acceleration causes a large rise "R" (FIG. 7(A)) of the air-fuel ratio which induces the variation of the controlled air-fuel ratio.

The system in FIG. 4 can prevent the control delay and the induced variation caused by the acceleration of the engine. The potentiometer 22 (FIG. 2) generates a voltage signal dependent upon the operation of the engine as shown in FIG. 3A. The acceleration signal shown in FIG. 3(A) is represented by the voltage of FIG. 3(I). The output signal Fig. 3(I) of the control system 3A is added to the output of the circuit 45 in the summation circuit 47. Thus, the delay "Td" of the detected middle value $C_0$ is compensated by adding the output of the control system 3A. On the other hand, a pulse generator 48 generates a pulse train, the pulse-repetition frequency of which varies according to the output 32 (FIG. 3(I)) of the control system 3A. The frequency increases with an increase of the output voltage FIG. 3(I), that is the angular velocity of the throttle valve 20. FIG. 5(f) shows the pulse repetition frequency of pulse generator 48 dependent upon the velocity of the opening of the throttle valve, namely the derivative of FIG. 3(A). The pulse train of FIG. 5(f) is added to the corrected middle value output signal of the circuit 47 (signal (d)+(f)) by the summing circuit 49. Thus, the corrected middle value output is converted to a pulse train as shown in FIG. 3(g) and the pulse-repetition frequency during the period according to the acceleration of FIG. 3(A) is increased.

The pulsed output signal of the summing circuit 49 is compared with the triangular wave pulses from the pulse generator 51 in the comparing circuit 50. As shown in FIG. 5(h) and FIG. 6 (FIG. 6 is the same as FIG. 5(h)), the pulsed output signal (g) compares and slices the triangular wave pulses (h), so that output pulses (i) are produced. The output pulses are fed to the on-off type electromagnetic valves 4 through the driving circuit 52 to actuate the valves. From FIG. 6, it will be seen that when the level of the signal (g) is high, a pulse having a greater pulse duty ratio is produced. Thus, when a small air fuel ratio is detected, the opening duration of the valves 4 is increased so that a leaner air-fuel mixture is supplied to the engine. When the engine is accelerated, the pulse-repetition frequency of the output pulses (i) is increased. Thus, the response of the control system may be quickened, so that variations of the air-fuel ratio can be decreased. Furthermore, the control delay due to the acceleration can be corrected. FIG. 7(C) shows the variation of the air-fuel ratio in the control system of the present invention, in which the air-fuel ratio is controlled to within a close range relative to the stoichiometric air-fuel ratio.

From the foregoing it will be understood that operating parameters of the throttle valve, such as angular velocity, angular acceleration, opening duration and the like may be quantitatively represented by the voltage, whereby the control delay and variation of the air-fuel ratio in an air-fuel ratio control system can be corrected and the desired emission control effect can be achieved.

What is claimed is:

1. A system for detecting the operation of a throttle valve of an internal combustion engine, comprising
    means comprising a transducer for converting a physical parameter of the operation of the throttle valve, into an electrical signal constituting an output voltage of said transducer,
    holding circuit means for periodically operatively receiving the output voltage of said transducer with respect to time and holding constant a value proportional to the periodically received output voltage of said transducer,
    an output circuit means for continuously producing a resulting voltage corresponding to the change of said value, at every periodic time interval of the operation of said holding circuit means, from said value at the respective prior time interval and proportional to angular velocity of the throttle valve respectively.

2. A system for detecting the operation of a throttle valve of an internal combustion engine according to claim 1, wherein
    said holding circuit means constitutes a sample-and-hold circuit comprising a gate and a pulse generator means for producing a pulse train for operating said gate so as to enable said sample-and-hold circuit to periodically operatively receive the output voltage of said transducer with respect to time and hold constant said value proportional to the periodically received output voltage of said transducer.

3. A system for detecting the operation of a throttle valve of an internal combustion engine, comprising
    means comprising a transducer for converting a physical parameter with respect to the operation of the throttle valve into an output voltage,
    a pair of sample-and-hold circuits electrically operatively connected to said transducer, each of said sample-and-hold circuits comprises a gate means and a voltage holding means for holding a value of said output voltage of said transducer at a time when said gate means is actuated for an interval thereafter,
    sampling pulse generator means for producing a pair of sampling pulse trains with a 180 degree phase difference,
    said sampling pulse generator means being connected to said gate means of each said sample-and-hold circuits for actuating said gate means so as to operate said sample-and-hold circuits alternately via said pair of sampling pulse trains, respectively,
    an operational amplifier comparator means having a non-inverting input and an inverting input for providing a resulting voltage constituting a differential voltage between signals applied to said non-inverting input and said inverting input,
    relay contact means for connecting an output of each of said sample-and-hold circuits to said non-inverting input and said inverting input, respectively, and
    relay means for actuating said relay contact means in synchronism with actuation of said sample-and-hold circuits so that the respective outputs of both said sample-and-hold circuits are feedable alternately to both said inputs of said operational amplifier comparator means with a fixed polarity, whereby the resulting voltage of said operational amplifier comparator means represents the change of the output voltage of said transducer per time increment between sequential pulses of said pair of sampling pulse trains.

4. A method for detecting the operation of a throttle valve of an internal combustion engine, comprising the steps of converting a physical parameter of the operation of the throttle valve into an electrical signal constituting an output voltage as a function of time, periodically detecting and holding constant a value of said output voltage at the periodically detecting time respectively, continuously producing from the held said constant value a resulting voltage, corresponding to the change of the output voltage per time increment between detecting times, which is proportional to angular velocity of the throttle valve.

5. A system for detecting the operation of a throttle valve of an internal combustion engine, comprising means comprising a transducer for converting a physical parameter of the operation of the throttle valve into an electrical signal constituting an output voltage of the transducer, holding circuit means constituting a sample-and-hold circuit comprising a holding capacitor and a gate operatively connected to each other, a pulse generator means connected to said gate for producing a pulse train of pulses having a constant period for operating said gate so as to enable said sample-and-hold circuit to detect a value of the output voltage of said transducer at every pulse and to hold said value for said period, respectively, and an output circuit means connected to said sample-and-hold circuit for continuously producing from said value a voltage, respectively, corresponding to the respective change of said output voltage per said period.

6. A system for detecting the operation of a throttle valve of an internal combustion engine, comprising means comprising a transducer for converting an arbitrarily varying physical parameter of operation of the throttle valve with respect to time into an electrical signal constituting an output voltage of the transducer as a function of time, circuit means for continuously providing a resulting voltage for successive intervals of a predetermined finite time increment $\Delta t$ as a function of time which is proportional to $\Delta V/\Delta t$, said resulting voltage being maintained constant during each successive interval and where $\Delta V$ is a voltage change of said output voltage during the previous successive interval.

7. The system as set forth in claim 1, 2, 3, 5 or 6, wherein said parameter is an opening angle of the throttle valve and said output voltage is proportional thereto.

8. The system as set forth in claim 1, 3 or 6 wherein said resulting voltage is constant and varies exclusively stepwise, respectively, proportional to the angular velocity of the throttle valve.

9. The system as set forth in claim 1, further comprising an output terminal, a diode and a resistor are connected in parallel between an output of said output circuit means and said output terminal, and a grounded capacitor is connected to said diode.

10. The system as set forth in claim 1, further comprising means for differentiating said resulting voltage representing the angular velocity of the throttle valve so as to obtain angular acceleration of the throttle valve.

11. The system as set forth in claim 3, further comprising an output terminal, a diode and a resistor are connected in parallel between an output of said comparator means and said output terminal, and a grounded capacitor is connected to said diode.

* * * * *